United States Patent Office 2,769,003
Patented Oct. 30, 1956

2,769,003

CARBONYLATION OF AZO COMPOUNDS AND PRODUCTS

William W. Prichard, Hockessin, Del., assignor to E. I. du Pont de Nemours and Company, Wilmington, Del., a corporation of Delaware No Drawing. Application February 29, 1956, Serial No. 568,428

6 Claims. (Cl. 260—244)

This invention relates to the carbonylation of azo compounds and, more particularly, to the carbonylation of aromatic azo compounds and to new compounds formed thereby.

This application is a continuation-in-part of my co-pending application, Serial No. 298,630, filed July 12, 1952, now abandoned. Insofar as the published literature reveals, there are no records of the art having reacted carbon monoxide with compounds containing nitrogen-nitrogen double bonds.

An object of the present invention is to provide a new process for the carbonylation of certain aromatic azo compounds. A further object is to provide a new class of compounds obtainable by the carbonylation of aromatic azo compounds. Other objects will be apparent from the description of the invention given hereinafter.

The above objects are accomplished according to the present invention by reacting an aromatic azo compound of the formula R—N=N—R' in which R and R' are selected from the group consisting of phenyl, hydroxyphenyl, alkoxyphenyl, naphthyl, aminotolyl, aminophenyl, hydroxynaphthyl, acetamidophenyl and halophenyl radicals, with at least 2 moles of carbon monoxide per mole of the aromatic azo compound in the presence of at least catalytic amounts of nickel tetracarbonyl.

It has now been discovered aromatic azo compounds providing they have at least one of the positions ortho to the azo nitrogen in each ring unsubstituted, may be satisfactorily carbonylated in the presence of nickel tetracarbonyl to give lactones of 2(3-hydroxyindazol-2-yl) monocarboxylic acids and quinazolinediones, the reaction being carried out at an elevated temperature broadly within the range of 175° C. to 450° C. and under at least autogenous pressure. The compounds formed are polycyclic compounds having fused rings, at least one of which contains annular nitrogen and oxo oxygen. The reaction mechanism by which the compounds are formed is not definitely known but the net effect of the reaction is illustrated by the following equation wherein the azo compound may have substitutents $R_1$ and $R_2$ on either or both of the benzene rings, selected from the group consisting of alkyl, alkoxy, amino, amido, halogen and hydroxyl substitutents. In the simplest case, when azobenzene is the starting azo compound, $R_1$ and $R_2$ are nonexistent. The reaction proceeds in the same way when either or both of the benzene rings are replaced by naphthalene nuclei in the azo compound:

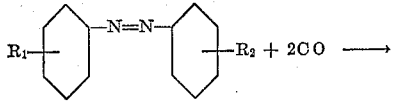

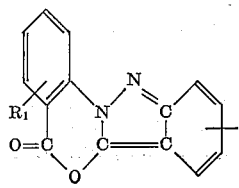

The process of this invention is conveniently carried out in a pressure reactor which is charged with the aromatic azo compound and nickel tetracarbonyl. It is preferred to provide the carbon monoxide for the reaction by the use of sufficient nickel tetracarbonyl to provide 2 moles of carbon monoxide per mole of azo compound. However, the carbon monoxide may be introduced as a gas into the pressure reactor but there must be some nickel tetracarbonyl present. After charging, the reactor is cooled, closed, and placed on an agitating rack and heated to between 175° C. and 450° C. until there is no further evidence of reaction as indicated by cessation of pressure drop. This will usually require between 0.5 and 2 hours at reaction temperature. After reaction is complete, the reactor is opened and the contents discharged. The product is isolated by extraction, distillation, crystallization, or by other methods well known to those skilled in the art.

The following examples in which all proportions are by weight unless otherwise stated, illustrate specific embodiments of the invention.

*Example I*

A silver-lined, pressure vessel having a volume equivalent to that of 400 parts of water, was charged with 20 parts of nickel and carbonyl, 20 parts azobenzene and 100 parts cyclohexane. The vessel was closed, and heated with agitation at 250° C. for one hour. The product was a mixture of solid and liquid, and weighed 111.3 parts. There were obtained by filtration 16.5 parts of solid material. Evaporation of the filtrate gave 1.7 parts of brown liquid which was identified as aniline by conversion to benzanilide and comparison with an authentic specimen. The solid material was sublimed, and the sublimate (12.5 parts) was extracted with hot acetone. The insoluble fraction consisted of 9.3 parts or 37% of the theoretically possible amount of the lactone of 2(3-hydroxyindazol-2-yl) benzoic acid. This was identified by its melting point of 300° C. and hydrolysis to 2(2-carboxyphenyl)indazolone, M. P. 124–125° C.

The acetone-soluble portion of the sublimate, 2.5 parts, was extracted with 10% sodium hydroxide solution. The soluble portion, 1.5 parts, recovered by acidification, was identified as 3-phenylquinazoline-2,4-dione, by its melting point, 280° C., and a mixed melting point with an authentic sample. The alkali-insoluble material, 1.0 part, was identified as symdiphenylurea by its melting point, 240–241° C., and by a mixed melting point with an authentic sample.

The above experiment was repeated using the same reactants but a heating cycle of 200° C. for four hours. From this product 5.2 parts of the lactone were obtained, and 7 parts of azobenzene were recovered unchanged.

*Example II*

Twelve parts of p-methoxyazobenzene, 12 parts nickel carbonyl and 100 parts cyclohexane were heated at 250° C. for 1 hour in a vessel as described in Example I. The product, 103.5 parts, was filtered to remove 12.4 parts of solid. The solid was extracted with hot chloroform. This left 3 parts of insoluble metallic nickel. Dilution of the extract with methanol and concentration gave 2.1 parts of yellow crystals melting at 236° C.

*Analysis.*—Calc'd. for $C_{15}H_9O_3N_2$: C, 67.9; H, 3.4; N, 10.55. Found: C, 67.77, 67.50; H, 3.80, 3.84; N, 10.60, 10.65.

This was a methoxy derivative of the lactone of 2(3-hydroxyindazol-2-yl)benzoic acid in which the position of the methoxyl substituent was not determined.

*Example III*

A vessel, as described in Example I, was charged with 15 parts of 1-methoxy-4-benzazonaphthalene, 15 parts nickel carbonyl, and 100 parts cyclohexane. The vessel was heated with agitation at 250° C. for one hour. The product, 108.5 parts, was filtered to remove 14 parts of dark solid. The solid was recrystallized from glacial acetic acid. This gave 4 parts of yellow crystalline material melting at 249–251° C.

*Analysis.*—Calc'd. for $C_{19}H_{12}O_3N_2$: C, 72.2; H, 3.80; N, 8.87. Found: C, 71.83, 71.90; H, 3.78; 3.56; N, 8.84, 8.84.

*Example IV*

A pressure vessel, as described in Example I, was charged with 80 parts azobenzene, 5 parts nickel carbonyl and 200 atmospheres impressed carbon monoxide pressure. The vessel was heated with agitation to 325° C. for 1 hour. The product consisted of 95.6 parts of black solid material. This was distilled and divided into four fractions as follows:

Fraction 1: Distilling below 180° C. at 1 mm. pressure, 8.1 parts liquid
Fraction 2: Distilling below 250° C. at 1 mm. pressure, 31.5 parts yellow solid
Fraction 3: Distilling below 300° C. at 0.1 mm. pressure, 26.0 parts yellow solid
Fraction 4: Black, nonvolatile residue, 22 parts Fraction 1 was identified as aniline. Fractions 2 and 3 were combined and extracted with hot acetone. The acetone-insoluble material, 27.6 parts, was the lactone of 2(3-hydroxyindazol-2-yl)benzoic acid, M. P. 300° C.

*Analysis.*—Calc'd. for $C_{14}H_8O_2N_2$: C, 71.2; H, 3.38; N, 11.85. Found: C, 71.42; H, 3.50; N, 11.90, 11.96.

This material was easily saponified by alcoholic sodium hydroxide to a white crystalline acid, M. P. 123–125° C. This was identified as 2-(2-carboxyphenyl)-indazolone.

*Analysis.*—Calc'd. for $C_{14}H_{10}O_3N_2$: C, 66.2; H, 3.94; N, 11.05. Found: C, 66.71; H, 4.01; N, 11.09, 10.94.

The acetone-soluble material was partly soluble in 10% sodium hydroxide solution; the soluble portion was reprecipitated by saturating the solution with carbon dioxide. This product melted at 280° C. and was identified as 3-phenylquinazoline-2,4-dione by a mixed melting point with an authentic sample. The portion of the acetone-soluble material, which was not alkali-soluble, melted at 240–241° C. and was identified as sym-diphenylurea by comparison with an authentic sample.

It will be understood that the above examples are merely illustrative and that the present invention broadly comprises reacting an aromatic azo compound as hereinbefore characterized, with at least 2 moles of carbon monoxide per mole of the aromatic azo compound in the presence of at least catalytic amounts of nickel tetracarbonyl and, as new compounds, the lactones of 2(3-hydroxyindazol - 2 - yl)monocarboxylic acids obtained from substituted azobenzenes.

While the process of this invention can be carried out at temperatures of 175° C. up to 450° C., the most useful range from the standpoint of product yield and reaction rate is from 200° C. to 350° C. and the process is usually carried out in this range. Pressure is not a critical factor and the reaction takes place satisfactorily under the autogenous pressure developed at the operating temperature although higher pressures can be used if desired.

It is preferred to use nickel tetracarbonyl, $Ni(CO)_4$, as the source of carbon monoxide because of ease of handling and good yields of desired products. The nickel carbonyl can be supplemented with carbon monoxide but, regardless of the source of carbon monoxide, an amount of carbon monoxide must be provided so that there are at all times at least 2 moles of carbon monoxide per mole of aromatic azo compound and, further, there must be at least 1% by weight of the aromatic azo compound. In practice, catalytically active nickel can be used with carbon monoxide inasmuch as nickel tetracarbonyl will be formed so that the use of catalytically active nickel with carbon monoxide is simply the equivalent of using preformed nickel carbonyl. Any excess of carbon monoxide over the 2-mole requirement of the reaction is vented off after completion of the reaction.

The use of a liquid reaction medium or diluent is not essential but in some instances it may have advantage in helping to moderate the reaction and bring about better contact between reactants. Suitable diluents or reaction media are carbon dioxide, ethyl acetate, cyclohexane, isooctane, propane, and benzene.

The carbonylation process of this invention is applicable to any aromatic azo compound conforming to the formula R—N=N—R' in which R is an aromatic nucleus and R' is either an aromatic nucleus or an unsaturated nitrogen heterocyclic residue having an at least six-membered ring structure, at least one of the positions ortho to the azo nitrogen in each ring being unsubstituted. Preferably, both R and R' are aromatic nuclei. R and R' can carry substituents such as alkyl, alkoxy, amino, amido, halogen, or hydroxyl, except in one of the two positions in each ring ortho to the azo nitrogen. Examples of suitable azo compounds are azobenzene, p-hyroxyazobenzene, p - methoxyazobenzene, p,p' - dimethoxyazobenzene, naphthaleneazobenzene, benzeneazopyridine, p-aminoazotoluene, 4-dimethylaminoazobenzene, β-naphtholazobenzene, benzeneabo-m-phenylenediamine, p-acetamidobenzeneazobenzene, m-chlorobenzeneazobenzene, azonaphthalene, 2 - anisoleazo - β - naphthol, and benzeneazoquinoline.

The new lactones of this invention contain the pyrazolone nucleus characteristic of pyrazolone dyes and have similar systems of conjugated double bonds. As in the case of the well-known pyrazolone dyes, the nucleus is a yellow-chromophore and the substituents act as auxochromes in varying the shade and intensity of color. These lactones are all characterized by being high melting, thermally stable, colored solids. Accordingly, these lactones are useful in finely divided form for pigmenting plastic compositions used in preparing films, fibers and moldings, in the same way that pyrazolone dyes have been used as pigments.

Since the lactone ring is readily opened to form soluble salts and is easily closed to reform the lactone by acidification and moderate heat, these lactones are particularly useful for imparting yellow shades to hydrophilic materials, such as cotton, regenerated cellulose and polyvinyl alcohol fibers. For example, the lactone of 2(3-hydroxyindazol-2-yl)benzoic acid is treated with sodium hydroxide to open the lactone ring, as in Example IV, and an aqueous solution of the sodium salt of 2-(2-carboxyphenyl)indazolone is impregnated in cotton fabric. The fabric is acidified with acetic acid and heated. This regenerates the lactone as a highly dispersed yellow pigment which is firmly fixed within the cotton fibers. Pigmented fabrics are prepared in the same way from the other lactones of this invention. More intensely colored pigments for this purpose are prepared from the alkoxy-substituted lactones by simple dealkylation to the corresponding hydroxy-substituted lactone and then coupling with diazonium salt, by procedure well-known in the art.

As many apparently widely different embodiments of this invention may be made without departing from the spirit and scope thereof, it is to be understood that the invention is not limited to the specific embodiments thereof except as defined in the appended claims.

The invention claimed is:

1. Process of carbonylating aromatic azo compounds which comprises reacting an aromatic azo compound of the formula R—N=N—R' in which R and R' are selected fro mthe group consisting of phenyl, hydroxyphenyl, alkoxyphenpyl, naphthyl, aminotolyl, aminophenyl, hydroxynaphthyl, acetamidophenyl and halophenyl radicals, with at least 2 mols of carbon monoxide per mole of said aromatic azo compound in the presence of at least catalytic amounts of nickel tetracarbonyl.

2. Process as set forth in claim 1 wherein said reaction is carried out at a temperature of 175° C. to 450° C. under at least autogenous pressure.

3. Process as set forth in claim 1 wherein said reaction is carried out at a temperature of 200° C. to 350° C. under at least autogenous pressure in the presence of sufficient nickel tetracarbonyl to provide said carbon monoxide.

4. Process of carbonylating azobenzene which comprises reacting azobenzene with at least 2 moles of carbon monoxide per mole of azobenzene in the presence of at least catalytic amounts of nickel tetracarbonyl, at a temperature of 175° C. to 450° C. under at least autogenous pressure.

5. Process of carbonylating azobenzene which comprises reacting azobenzene with at least 2 moles of carbon monoxide per mole of azobenzene in the presence of sufficient nickel tetracarbonyl to provide said carbon monoxide, at a temperature of 200° C. to 350° C. under at least autogenous pressure.

6. As a new compound, a lactone of a 2(3-hydroxy-indazol-2-yl)monocarboxylic acid having the formula

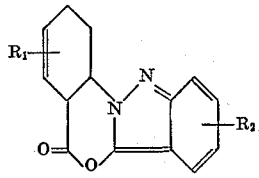

wherein $R_1$ and $R_2$ are lower alkoxy substituents.

No references cited.